Patented Apr. 26, 1949

2,468,681

UNITED STATES PATENT OFFICE 2,468,681

PURIFICATION OF HYDROGEN FLUORIDE

Robert H. McBride, Gary, Ind., assignor to the United States of America as represented by the United States Atomic Energy Commission No Drawing. Application March 9, 1948, Serial No. 13,947

2 Claims. (Cl. 23—309)

This invention relates to the purification of hydrogen fluoride and more particularly to the removal of fluorinated organic impurities from the by-product hydrogen fluoride created in the synthesis of perfluoro-dimethyl-cyclohexane from bis (trifluoromethyl) benzene by a novel solvent extraction process.

Perfluoro-dimethyl-cyclohexane may be readily made by fluorinating bis (trifluoromethyl) benzene. The desired fluorination may be carried out by passing vaporized bis (trifluoromethyl) benzene through a reactor charged with cobaltic fluoride. This method of synthesizing perfluoro-dimethyl-cyclohexane is more fully described in the articles by Fowler et al., Burford et al., and Benner et al., which commence respectively on pages 292, 319 and 329 of the March 1947 issue of Industrial and Engineering Chemistry (vol. 39, No. 3), and it is therefore unnecessary to give a detailed discussion of this fluorination procedure in the present specification. The reaction of bis (trifluoromethyl) benzene with cobaltic fluoride results not only in the synthesis of perfluoro-dimethyl-cyclohexane but also leads to the production of hydrogen fluoride and some incompletely fluorinated organic compounds that are soluble in anhydrous hydrogen fluoride. When these reaction products are condensed they form two liquid layers in the receiver. The hydrogen fluoride which has the lower specific gravity forms the upper layer in the receiver. This hydrogen fluoride layer contains from 2 to 5% of fluorinated organic compounds dissolved therein. It is desirable to make use of this hydrogen fluoride in a fluorine cell for generating fluorine employed to convert spent cobalt fluoride in the reactor to cobaltic fluoride. It is desirable to eliminate the organic impurities from the hydrogen fluoride produced in this synthesis before the hydrogen fluoride is utilized in a fluorine cell for the production of fluorine so that these impurities will not adversely affect the operation of the fluorine cell. Attempts to separate these impurities from the hydrogen fluoride by a distillation procedure are not entirely satisfactory since these impurities form an azeotropic mixture with the hydrogen fluoride.

It is therefore an object of the present invention to purify hydrogen fluoride containing fluorinated organic impurities so that it may be utilized in a fluorine cell. A further object of the present invention is to treat hydrogen fluoride which is contaminated with fluorinated organic compounds by a feasible process which will result in the production of fairly pure hydrogen fluoride. A still further object of the present invention is to make the by-product hydrogen fluoride created in the synthesis of perfluoro-dimethyl-cyclohexane sufficiently pure so that it is technically useful. Other objects will appear hereinafter.

These objects are accomplished in accordance with the present invention by a solvent extraction process in which the fluorinated organic impurities contained in the by-product hydrogen fluoride created in the synthesis of perfluoro-dimethyl-cyclohexane are washed out with a solvent such as perfluoro-methyl-cyclohexane or perfluoro-dimethyl-cyclohexane.

In carrying out the extraction process of the present invention one generally proceeds in the following manner. Hydrogen fluoride containing a known amount of fluorinated organic impurities is weighed into a copper flask fitted with two stainless steel blunt nosed needle valves. The valves are attached to a screw cap which fits into the top of the flask. One valve is attached to a nipple which extends to the bottom of the flask to serve as a pressure relief when the flask is inverted.

The flask is cooled in a bath of solid carbon dioxide and acetone. The extractant is added, both valves are closed and the flask is shaken vigorously for two or three minutes. The flask is then inverted for one or two minutes to allow the layers to separate.

The pressure relief valve is then opened, and the extractant is drained into a container holding ice. Great care is taken to insure the complete drainage of the organic layer.

100 grams of the hydrogen fluoride layer is drained into a 1 liter tared Erlenmeyer flask containing 100 grams of boric acid powder and approximately 400 grams of chipped ice. The flask is connected to a standard 2 ml. moisture test separator. The mixture is boiled until all the organic material has steam distilled into the separator. The organic layer is then measured and the percentage of organic impurity remaining in the hydrogen fluoride thus determined.

The results of five extractions made in accordance with the foregoing procedure are set forth below in the table. In column 1 of this table, the extractant used is indicated. $C_7F_{14}$ indicates the use of perfluoro-methyl-cyclohexane, and $C_8F_{16}$ denotes the use of perfluoro-dimethyl-cyclohexane. Column 2 indicates how much extractant is used in each extraction in terms of a percentage by weight of the impure hydrogen fluoride being extracted. Columns 3, 4 and 5 indicate the percentage of fluorinated organic impurities in the crude hydrogen fluoride being purified and what remains after the first and second extractions respectively.

Table

| Extractant Used | Amount Used Per Extraction (by Weight) | Impurities in Crude HF Before Extraction | Impurities After 1st Extraction | Impurities After 2nd Extraction |
|---|---|---|---|---|
| | Per cent | Per cent | Per cent | Per cent |
| $C_7F_{14}$ | 36 | 2.8 | 0.87 | 0.15 |
| $C_7F_{14}$ | 36 | 3.1 | 0.69 | |
| $C_8F_{16}$ | 36 | 3.0 | 1.4 | 0.92 |
| $C_8F_{16}$ | 18 | 3.4 | 2.3 | 1.0 |
| $C_8F_{16}$ | 18 | 3.0 | 2.3 | 1.3 |

Consideration of the above table shows that both perfluoro-methyl-cyclohexane and perfluoro-dimethyl-cyclohexane are quite effective in removing fluorinated organic impurities from by-product hydrogen fluoride which is created in the synthesis of perfluoro-dimethyl-cyclohexane by fluorination of bis (trifluormethyl) benzene. The hydrogen fluoride which has been purified by this extraction procdure is sufficiently free from organic contaminants that it may be utilized in an electrolytic cell for generating fluorine. It has been found that a better separation of these fluorinated organic impurities from anhydrous hydrogen fluoride can be accomplished by the extraction procedure outlined in the present application than by resort to distillation. Perfluoro-methyl-cyclohexane appears to be somewhat superior to perfluoro-dimethyl-cyclohexane as an extractant. Furthermore perfluoro-methyl-cyclohexane is more readily separated from the extracted impurities by distillation, and thus is made available for re-use.

Resort may be had to such modifications and variations as fall within the spirit of the invention and the scope of the appended claims.

I claim:

1. A process of separating anhydrous hydrogen fluoride from fluorinated organic compounds which are soluble in hydrogen fluoride and which are produced in the synthesis of perfluoro-dimethyl-cyclohexane which comprises extracting said fluorinated organic compounds from the hydrogen fluoride with an organic solvent selected from the group consisting of perfluoro-methyl-cyclohexane and perfluoro-dimethyl-cyclohexane.

2. A process of purifying anhydrous hydrogen fluoride which is contaminated with fluorinated organic compounds which are soluble in hydrogen fluoride and which are produced in the synthesis of perfluoro-dimethyl-cyclohexane which comprises removing said fluorinated organic compounds from the contaminated hydrogen fluoride by extracting them therefrom by means of an organic solvent selected from the group consisting of perfluoro-methyl-cyclohexane and perfluoro-dimethyl-cyclohexane.

ROBERT H. McBRIDE.

No references cited.